United States Patent [19]

Refior et al.

[11] Patent Number: 5,131,594
[45] Date of Patent: Jul. 21, 1992

[54] SEAT BELT COMFORT MECHANISM

[75] Inventors: Lawrence M. Refior, St. Clair; Glyn O. Dykins, Rochester Hills, both of Mich.

[73] Assignee: TRW Vehicle Safety Systems Inc., Lyndhurst, Ohio

[21] Appl. No.: 557,628

[22] Filed: Jul. 24, 1990

[51] Int. Cl.$^5$ .............................................. B60R 22/44
[52] U.S. Cl. .................................................... 242/107
[58] Field of Search ......... 242/107, 107.4 R, 107.4 A, 242/107.4 B; 280/806, 807; 297/476, 477, 478, 475

[56] References Cited

U.S. PATENT DOCUMENTS

| | | | |
|---|---|---|---|
| 4,026,494 | 5/1977 | Tanaka | 242/107 |
| 4,084,764 | 4/1978 | Mogerlein et al. | 242/107 |
| 4,108,393 | 8/1978 | Henderson | 242/107 |
| 4,125,231 | 11/1978 | Henderson | 242/107 |
| 4,183,476 | 1/1980 | Fohl | 242/107 |
| 4,216,922 | 8/1980 | Weman | 242/107 |
| 4,228,968 | 10/1980 | Jahn | 242/107 |
| 4,310,128 | 1/1982 | Morita et al. | 242/107 |
| 4,534,520 | 8/1985 | Yanagihara | 242/107 |

Primary Examiner—John M. Jillions
Attorney, Agent, or Firm—Tarolli, Sundheim & Covell

[57] ABSTRACT

A seat belt retractor includes a mechanism for reducing the tension in the seat belt webbing. The retractor also includes a rewind spring which biases a retractor spool to wind the webbing onto the spool. The tension reducing mechanism comprises a comfort spring which is selectively engaged to counteract the biasing force of the rewind spring. The counteracting force of the comfort spring is applied throughout any range of movement of the vehicle occupant with the webbing fastened around the occupant. The amount of the counteracting force may be varied by the occupant. The comfort spring is engaged to oppose the rewind spring throughout winding up and unwinding of any length of webbing which is wound onto the retractor spool after the webbing is fastened around the occupant. The counteracting force of the comfort spring is proportional to the length of webbing wound onto the retractor spool while the webbing is fastened around the occupant.

26 Claims, 3 Drawing Sheets

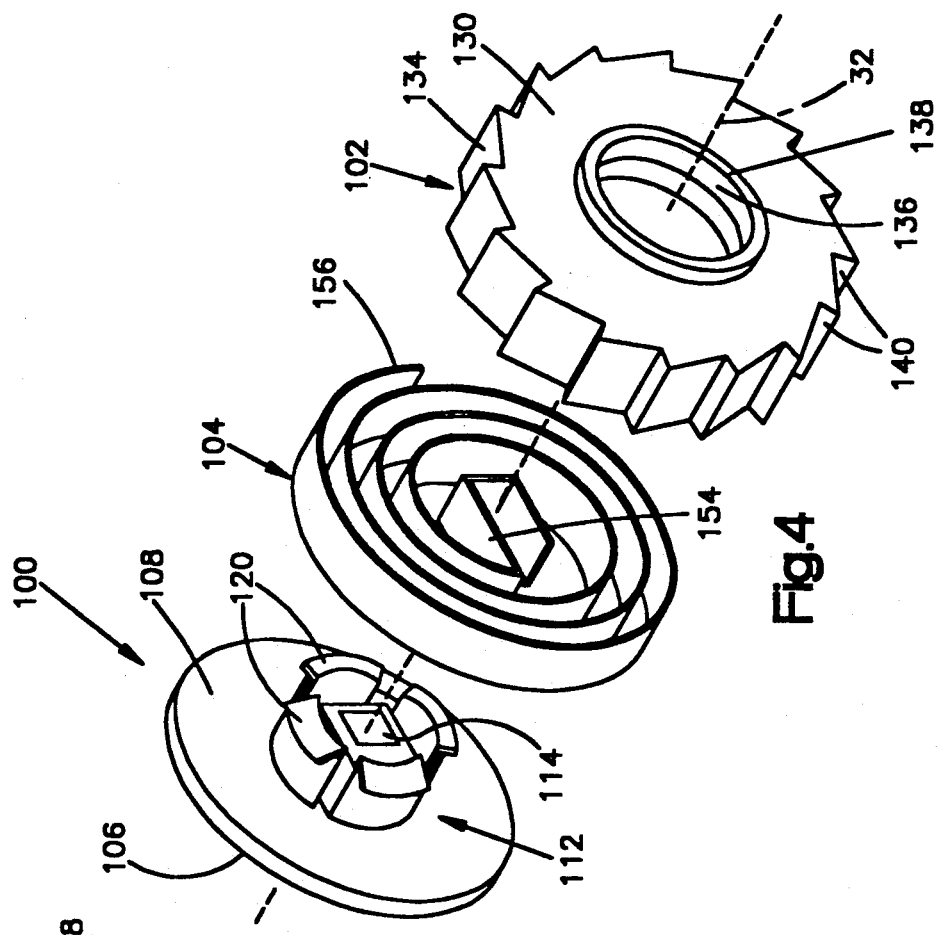
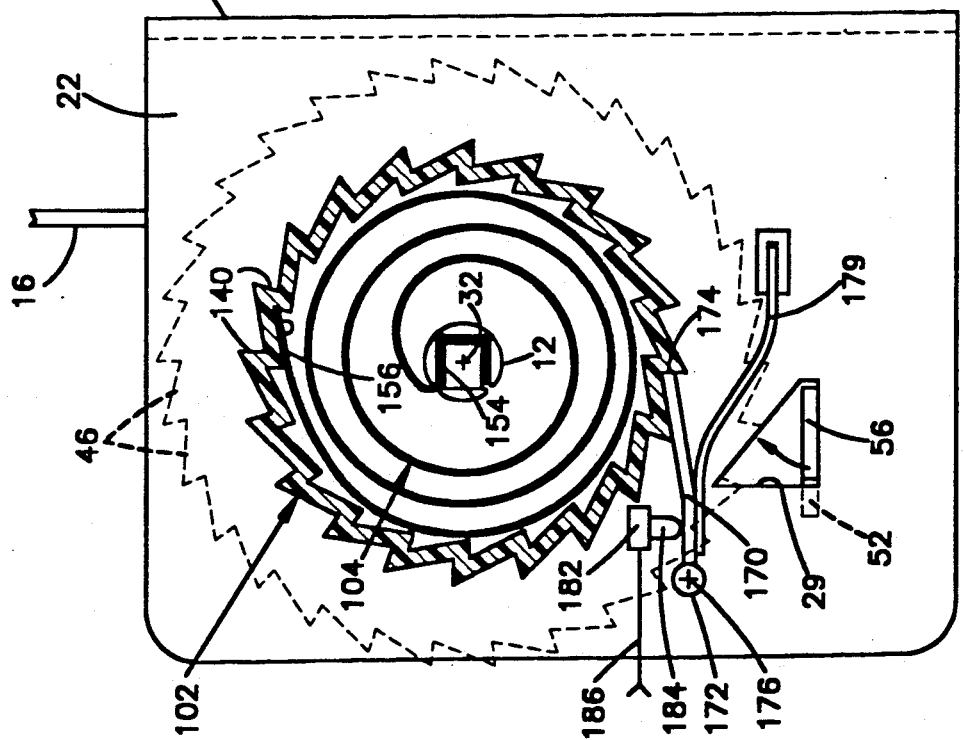

SEAT BELT COMFORT MECHANISM

FIELD OF THE INVENTION

The present invention relates to a vehicle seat belt retractor, and particularly relates to a vehicle seat belt retractor having a mechanism for reducing tension in the seat belt webbing.

BACKGROUND OF THE INVENTION

A known vehicle seat belt retractor comprises a spool for holding a wound length of seat belt webbing. The spool is supported for rotation in winding and unwinding directions. A spring biases the spool to rotate in the winding direction to wind up the webbing onto the spool. The spool rotates in an unwinding direction against the force of the spring when the webbing is unwound from the spool to be buckled around a vehicle occupant. After the webbing is buckled around a vehicle occupant, slack in the webbing is wound onto the spool because the spool is rotated in the winding direction by the spring. The webbing is thereafter held against the vehicle occupant by the force of the spring biasing the spool to rotate in the winding direction. A locking mechanism prevents unwinding of the webbing from the spool in order to hold the vehicle occupant from moving forward in a crash. However, forward movements of the vehicle occupant under noncrash conditions, such as to reach across the vehicle interior, are restrained by the tension in the webbing which results from the force of the spring biasing the spool to wind up the webbing.

Mechanisms for reducing tension in seat webbing are known. U.S. Pat. No. 4,026,494 discloses a comfort spring to counteract the force of a rewind spring which biases a retractor spool to wind up the webbing. One end of the comfort spring is connected to a housing for the seat belt retractor. The other end of the comfort spring is connected to a rotatable disk which carries a pawl. When the spool rotates to wind up the webbing, the spool turns a ratchet wheel connected to the spool. The ratchet wheel has teeth which engage the pawl carried on the rotatable disk. The comfort spring is then connected in opposition to the rewind spring through the rotatable disk, the pawl, and the ratchet wheel connected to the spool. The comfort spring thereby resists the force of the rewind spring biasing the spool to wind up the webbing. The resistance of the comfort spring against the rewind spring reduces the tension which the rewind spring applies to the webbing. A cam disengages the pawl from the ratchet wheel in order to disengage the comfort spring from the rewind spring after the spool rotates approximately one-half of a revolution about its axis. The comfort spring therefore reduces tension in the webbing throughout movement of only a few inches of the webbing.

SUMMARY OF THE INVENTION

In accordance with the present invention, a seat belt retractor comprises a spool for holding seat belt webbing to be buckled around a vehicle occupant, a rewind spring, and a comfort means. The spool is supported for rotation in winding and unwinding directions. The rewind spring biases the spool to rotate in the winding direction. The comfort means selectively applies a force to counteract at least some of the winding force of the rewind spring. The comfort means applies the counteracting force in response to rewinding of the webbing onto the spool by the rewind spring after the webbing has been unwound and buckled around a vehicle occupant. The counteracting force is applied throughout unwinding and rewinding of any length of webbing which is wound onto the spool while the webbing is buckled around a vehicle occupant.

A seat belt retractor in accordance with the present invention provides a reduced level of tension in the webbing throughout any range of movement of the vehicle occupant in noncrash conditions. In distinction to the prior art, a seat belt retractor in accordance with the present invention does not disengage the comfort means after a short length of the webbing is wound onto the spool. Instead, the counteracting force of the comfort means may be applied to reduce tension in the webbing throughout movement of the vehicle occupant which unwinds and rewinds any length of the webbing wound onto the spool while buckled around the occupant.

In accordance with another feature of the present invention, a seat belt retractor comprises comfort means which is actuated in response to rewinding of seat belt webbing onto a retractor spool by a rewind spring after the webbing has been unwound and buckled around a vehicle occupant. The comfort means applies a counteracting force which is proportional to any length of the webbing which is wound onto the retractor spool while the webbing is buckled around the vehicle occupant.

This feature of the present invention enables the vehicle occupant to vary the amount of the counteracting force applied by the comfort means, and thereby to vary the degree of comfort. If the vehicle occupant unwinds the maximum length of webbing from the spool after buckling, and then lets that length of webbing rewind back onto the spool so that the webbing rests against the occupant, the comfort means will apply a counteracting force which is proportional to the maximum length of webbing which was wound back onto the spool after the webbing was buckled. The occupant will then experience the maximum degree of comfort. If the occupant unwinds only a relatively short length of webbing from the spool after buckling, and then allows that length of webbing to rewind back onto the spool, the comfort means will apply a counteracting force which is proportional to the relatively short length of webbing which was wound back onto the spool. The occupant will then experience a lesser degree of comfort. The degree of comfort experienced by the occupant can be selected and varied by unwinding varying lengths of webbing from the spool after the webbing is buckled around the occupant.

BRIEF DESCRIPTION OF THE DRAWINGS

These and other features of the invention will become apparent to those skilled in the art upon reading the following description of a preferred embodiment of the invention in view of the accompanying drawings in which;

FIG. 3 is a view of the seat belt retractor of FIG. 2 showing parts in shifted positions;

FIG. 4 is an exploded perspective view of components of the seat belt retractor of FIG. 1.

DESCRIPTION OF A PREFERRED EMBODIMENT

Figure 1:
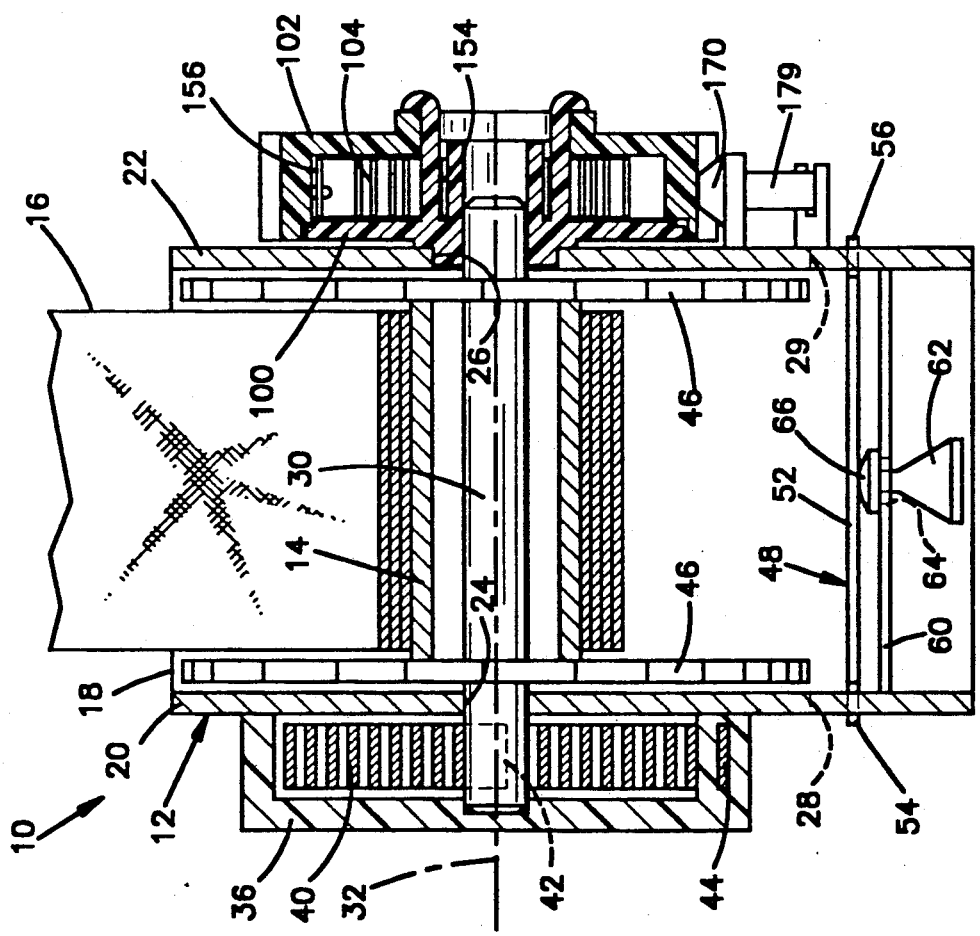
FIG. 1 is a front sectional view of a seat belt retractor in accordance with the present invention.

As shown in FIG. 1, a seat belt retractor 10 in accordance with the present invention comprises a frame 12 supporting a spool 14 on which seat belt webbing 16 is wound. The spool 14 is supported for rotation in winding and unwinding directions relative to the frame 12 to wind up and to unwind the webbing 16.

The frame 12 comprises a base 18, and a pair of parallel, spaced apart side walls 20 and 22 extending outwardly from the base 18. The side walls 20 and 22 have bearing surfaces 24 and 26 which define apertures through the side walls 20 and 22, respectively. The side walls 20 and 22 have pawl engaging surfaces 28 and 29 which also define apertures through the side walls 20 and 22, respectively. The spool 14 comprises a shaft 30 having an axis 32. The shaft 30 extends through the apertures defined by the bearing surfaces 24 and 26 at the side walls 20 and 22, and is rotatable about the axis 32 relative to the frame 12 in winding and unwinding directions.

A housing 36 is supported on the outer surface of the side wall 20 as shown in FIG. 1. A rewind spring 40 is contained within the housing 36. The rewind spring 40 has an inner end 42 connected to the shaft 30, and an outer end 44 connected to the housing 36. The rewind spring 40 biases the shaft 30 to rotate in the winding direction to wind the webbing 16 onto the spool 14. The rewind spring 40 also permits the shaft 30 to rotate in an unwinding direction against the force of the rewind spring 40 for the webbing 16 to be unwound from the spool 14.

Figure 2:
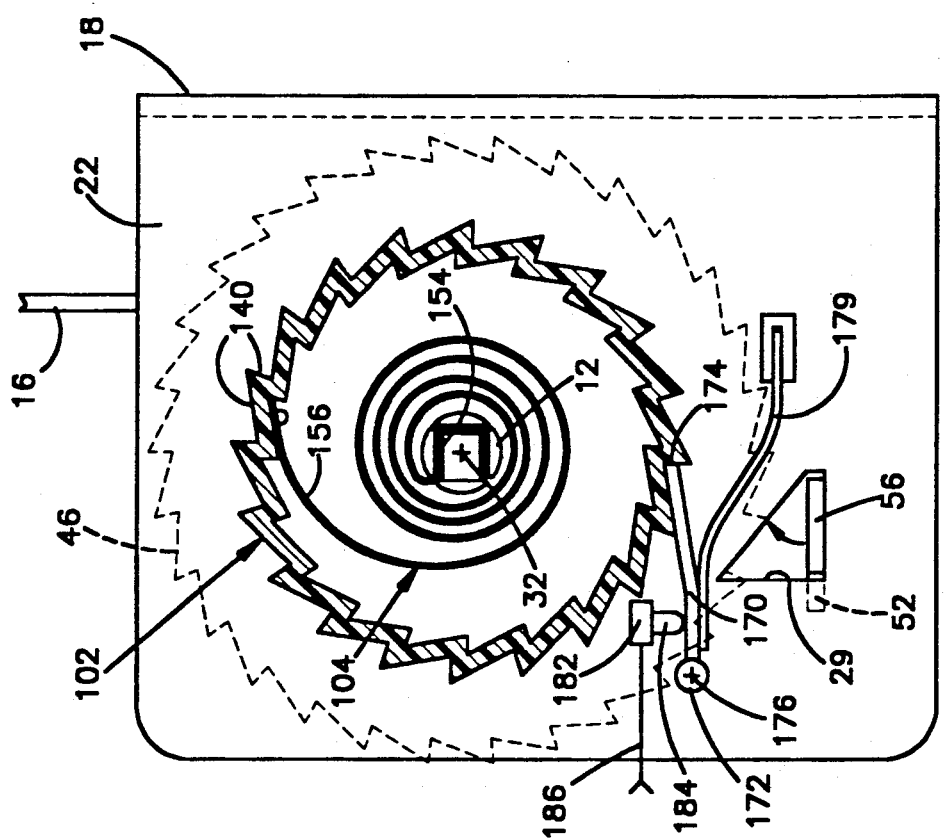
FIG. 2 is a side sectional view of the seat belt retractor of FIG. 1.

A locking mechanism is included in the seat belt retractor 10 to prevent the webbing 16 from being unwound from the spool 14 when the vehicle experiences a crash. The locking mechanism comprises a pair of ratchet wheels 46 and a locking pawl 48. The ratchet wheels 46 are mounted coaxially on the shaft 30, and rotate with the shaft 30 in the winding and unwinding directions. The locking pawl 48 is an elongated member having a locking portion 52 and opposite end portions 54 and 56. The opposite end portions 54 and 56 of the locking pawl 48 extend through the apertures defined by the pawl engaging surfaces 28 and 29 at the opposite side walls 20 and 22, respectively. The apertures defined by the pawl engaging surfaces 28 and 29 permit limited pivotal movement of the opposite end portions 54 and 56 of the locking pawl 48, as indicated in FIGS. 2 and 3. The locking mechanism further comprises a supporting member 60 and a pendulum 62. The supporting member 60 has a surface 64 defining an aperture through the supporting member 60. The pendulum 62 extends through the aperture defined by the surface 64 on the supporting member 60. A head portion 66 of the pendulum 62 supports the pendulum 62 on the member 60.

When the vehicle experiences a crash, the pendulum 62 pivots to move the head portion 66 against the locking pawl 48. Movement of the head portion 66 of the pendulum 62 against the locking pawl 48 moves the locking pawl 48 upwardly as indicated in FIGS. 2 and 3. Upward movement of the locking pawl 48 moves the locking portion 52 of the locking pawl 48 into engagement with the teeth on the ratchet wheels 46. The ratchet wheels 46 and the spool 14 are prevented from rotating in the unwinding direction when the locking portion 52 of the locking pawl 48 is engaged with the teeth on the ratchet wheels 46. The webbing 16 is thereby prevented from unwinding from the spool 14 when the vehicle experiences a crash.

The seat belt retractor 10 further comprises a comfort mechanism for reducing the tension in the webbing 16 in order to reduce the force which the webbing 16 exerts against a seated occupant of the vehicle when the webbing 16 is buckled around the occupant. The comfort mechanism includes an arbor 100, a ratchet wheel 102, and a comfort spring 104. As indicated in FIG. 4, the arbor 100, the ratchet wheel 102, and the comfort spring 104 are coaxially aligned on the axis 32.

Figure 5:
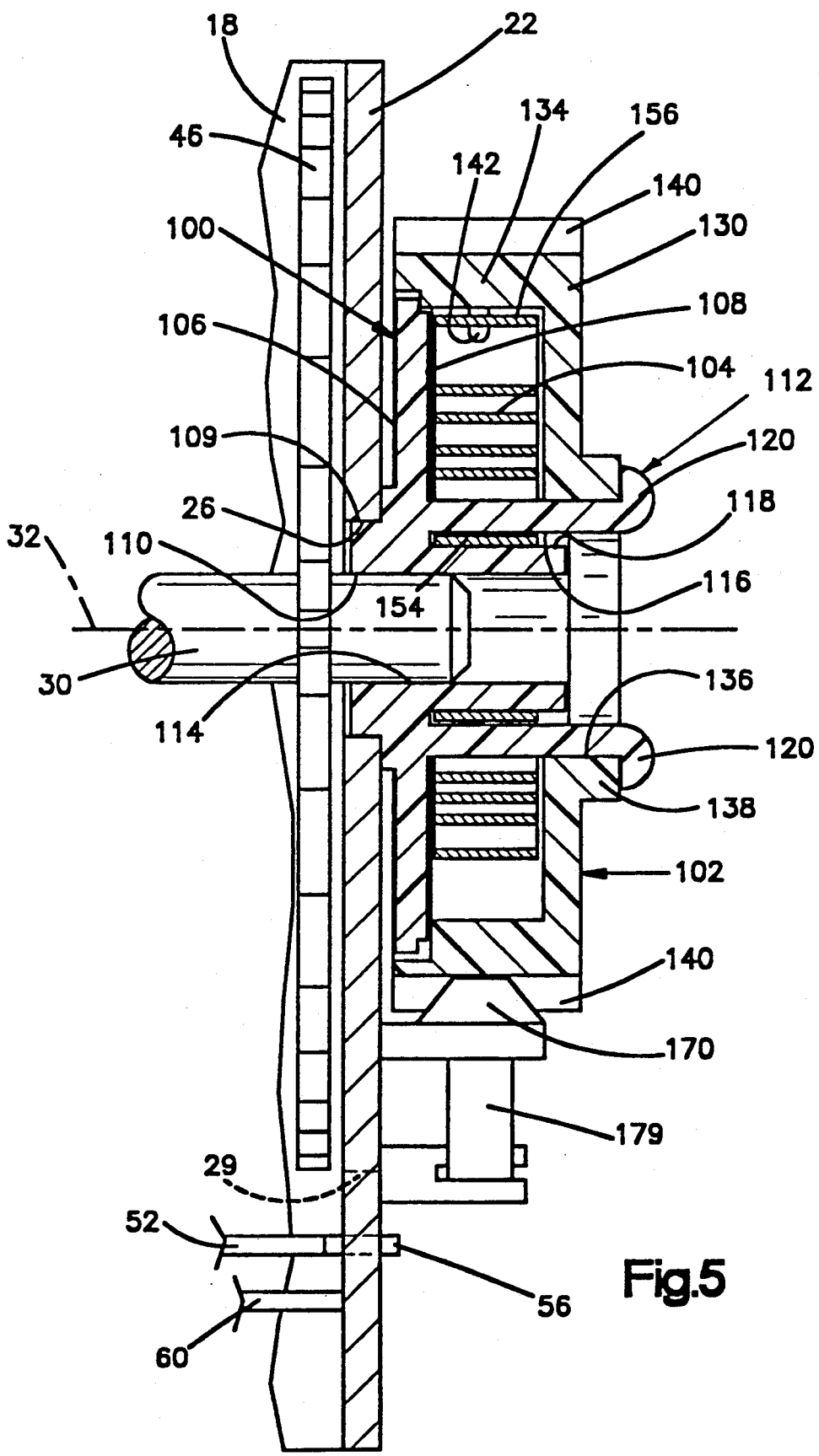
FIG. 5 is an enlarged partial view of the seat belt retractor of FIG. 1.

As shown in FIG. 5, the arbor 100 is a disc-shaped member having an inner side surface 106 and an outer side surface 108. A projection 109 at the inner side surface 106 includes a surface 110 defining a rectangular opening through the arbor 100 which is centered on the axis 32. A generally circular hub 112 extends outwardly from the outer side surface 108 of the arbor 100. The hub 112 has an inner surface 114 which defines a rectangular sleeve extending outwardly away from the rectangular opening defined by the surface 110. The hub 112 also has opposed inner surfaces 116 and 118 which define a slot extending around three sides of the rectangular sleeve. Four spaced apart locking lugs 120 (FIG. 4) extend radially from the outer end of the hub 112, and are resiliently flexible radially.

The projection 109 at the inner side surface 106 of the arbor 100 fits within the aperture defined by the bearing surface 26 at the side wall 22. A rectangular end portion of the shaft 30 of the spool 14 extends through the opening defined by the surface 110 and into the sleeve defined by the inner surface 114. The arbor 100 is thereby supported for rotation with the spool 14 in the winding and unwinding directions.

The ratchet wheel 102 has an outer side wall 130, and a wall 134 extending axially from the periphery of the outer side wall 130. The wall 134 of the ratchet wheel 102 is formed to define a circumferentially extending group of ratchet teeth 140. A connecting pin 142 extends radially inwardly from the wall 134 of the ratchet wheel 102. The outer side wall 130 of the ratchet wheel has a circular surface 136 defining an opening centered on the axis 32, and an axially extending, circular rim 138 which is also centered on the axis 32. The annular surface 136 of the ratchet wheel 102 is received coaxially over the hub 112 on the arbor 100, and the locking lugs 120 are snapped into position over the rim 138. The ratchet wheel 102 is thereby supported for rotation about the axis 32 relative to the arbor 100 in the winding and unwinding directions.

The comfort spring 104 has a first end portion 154, and a second end portion 156. The first end portion 154 of the comfort spring 104 extends through the slot defined by the opposed inner surfaces 116 and 118 in the hub 112. The first end portion 154 of the comfort spring 104 is thereby connected to the arbor 100 for rotation with the arbor 100 and spool 14 in the winding and unwinding directions. The second end portion 156 of the comfort spring 104 is connected to the pin 142 at the cylindrical wall 134 of the ratchet wheel 102. The second end portion 156 is thereby connected to the ratchet wheel 102 for rotation with the ratchet wheel 102 in the winding and unwinding directions. The comfort spring 104 extends in a coil from the first end portion 154 to the second end portion 156 in a clockwise direction as shown in the Figures. The comfort spring 104 tends to wind itself up into a contracted, unstressed state shown in FIG. 2.

A comfort pawl 170 has a first end 172 and a second end 174. The first end 172 of the comfort pawl 170 is supported on the sidewall 22 of the frame 12 for rotation about an axis 176 as shown in FIGS. 2 and 3. The second end 174 of the comfort pawl 170 is normally engaged against one of the ratchet teeth 140 on the ratchet wheel 102 under the biasing force of a leaf spring 179. A disengagement mechanism shown schematically in the Figures comprises a plunger 182 which activates a reciprocating arm 184. A cable 186 extends from the plunger 182 to the vehicle door. When the vehicle door is opened, a spring (not shown) responds by applying tension to the cable 186 in order to activate the plunger 182. The plunger 182 then moves the reciprocating arm 184 against the comfort pawl 170. The comfort pawl &70 is thus moved out of engagement with the ratchet teeth 140 against the biasing force of the leaf spring 179. While the drawings illustrate a mechanism for disengaging the comfort pawl 170 from the ratchet teeth 140 in response to opening of the vehicle door, other means for disengaging the comfort pawl may be used.

To use a seat belt system including a seat belt retractor in accordance with the present invention, a vehicle occupant unwinds the webbing 16 from the spool 14. The occupant then carries the webbing toward a location where the webbing 16 extends across the occupant and is fastened to a buckle. The spool 14 is thereby rotated in the unwinding direction (counterclockwise as shown in FIGS. 2 and 3) against the biasing force of the rewind spring 40. When the spool 14 rotates in the unwinding direction, the first end portion 154 of the comfort spring 104 rotates in the unwinding direction with the spool 14. The second end portion 156 of the comfort spring 104 is pulled by the comfort spring 104 to follow the first end portion 154, and also rotates in the unwinding direction. The ratchet wheel 102 is then pulled by the second end portion 156 of the comfort spring 104 to rotate in the unwinding direction when the webbing 16 is unwound from the spool 14 by the occupant of the vehicle. The spring biased comfort pawl 170 permits the ratchet wheel 102 to rotate in the unwinding direction.

A vehicle occupant will usually unwind a length of the webbing 16 which is slightly longer than the length needed to reach the buckle. Therefore, a short length of the webbing 16 will exist as slack after the webbing 16 is fastened to the buckle. Since the rewind spring 40 continuously biases the spool 14 in the winding direction, the rewind spring 40 will bias the spool 14 to rotate in the winding direction (clockwise as shown in FIGS. 2 and 3) in order to wind up the short length of slack in the webbing 16. When the spool 14 rotates in the winding direction under the winding force of the rewind spring 40, the first end portion 154 of the comfort spring 104 rotates in the winding direction with the spool 14. Rotation of the first end portion urges the second end portion 156 of the comfort spring 104 to follow in the winding direction. However, the spring biased comfort pawl 170 blocks rotation of the ratchet wheel 102 in the winding direction. The second end portion 156 of the comfort spring 104 is thereby blocked from rotation in the winding direction when the spool 14 rotates in the winding direction. Rotation of the spool 14 under the winding force of the rewind spring 40 therefore causes the first end portion 154 of the comfort spring 104 to rotate relative to the second end portion 156 of the comfort spring 104 in the winding (clockwise) direction. Rotation of the first end portion 154 of the comfort spring 104 relative to the second end portion 156 in the winding direction stresses the comfort spring 104 from the contracted, unstressed position shown in FIG. 2 toward an expanded, stressed position as shown in FIG. 3. Since the comfort spring 104 is stressed by rotation of the spool 14 in the winding direction under the winding force of the rewind spring 40, the force of the stressed comfort spring 104 opposes the winding force of the rewind spring 40. The force of the stressed comfort spring 104 is a counteracting force which reduces the tension imparted to the webbing 16 by the winding force of the rewind spring 40.

The amount of counteracting force provided by the comfort spring 104 to reduce tension in the webbing 16, and hence the degree of comfort provided by the comfort spring 104, can be varied by the vehicle occupant. After the webbing 16 is unwound from the spool 14 and while the webbing is fastened to a buckle, the vehicle occupant can unwind an additional length of the webbing 16 from the spool 14. When the vehicle occupant lets the additional unwound length of the webbing 16 wind back onto the spool 14 under the rewinding force of the retractor spring 40, the comfort spring 104 is continuously stressed by the rewind spring 40 from the contracted, unstressed position shown in FIG. 2 toward the expanded, stressed position shown in FIG. 3. The comfort spring 104 is therefore stressed in an amount proportional to the length of the webbing 16 which is wound onto the spool 14 as the spool 14 rotates back in the winding direction. The amount of stress applied to the comfort spring 104 by the rewind spring 40, and hence the degree to which the comfort spring 104 opposes the rewind spring 40 to reduce tension in the webbing 16, can therefore be varied by the vehicle occupant by varying the additional length of the webbing which is unwound from the spool 14 and permitted to wind back onto the spool 14 after the webbing 16 is fastened to the buckle. If the occupant unwinds the maximum length of additional webbing 16 from the spool 14 after buckling, the maximum amount of stress will be applied to the comfort spring 104 when the maximum length of additional webbing 16 is wound back onto the spool 14. The occupant will then experience the maximum degree of comfort. If the occupant unwinds a shorter length of additional webbing 16 after buckling, the stress applied to the comfort spring 104 will be proportionately less when the shorter length of additional webbing 16 is wound back onto the spool 14. The occupant will then experience a proportionately lesser degree of comfort.

The counteracting force of the comfort spring 104 is also applied throughout subsequent unwinding of the same length of slack or additional unwound webbing 16 until the comfort spring 104 returns to its original unstressed condition. The comfort spring 104 can therefore apply a counteracting force throughout unwinding and winding up of any length of the webbing 16 which is wound onto the spool 14 after the webbing 16 is fastened to the buckle. A seat belt retractor in accordance with the present invention therefore overcomes the disadvantage of prior art seat belt retractors which disengage a comfort mechanism after movement of only a short length of the webbing.

The comfort pawl 170 blocks rotation of the ratchet wheel 102 in the winding direction until the disengagement mechanism moves the comfort pawl 170 out of engagement with the ratchet wheel 102. When the disengagement mechanism responds to opening of the vehicle door by disengaging the comfort pawl 170 from the ratchet wheel 102, the comfort spring 104 is no longer engaged to oppose the rewind spring 40. The rewind spring 40 can then wind up the remaining webbing 16 quickly and forcefully to move the webbing 16 into a fully wound up, parked position for the occupant to exit the vehicle.

Importantly, the comfort spring 104 has a length between the first and second end portions 154 and 156 which permits the comfort spring 104 to be stressed and expanded by rotation of the spool 14 in the winding direction until the disengagement mechanism moves the comfort pawl 170 out of engagement with the ratchet wheel 102. This ensures that the comfort spring 104 will not reach a fully expanded and stressed position which could block rotation of the spool 14 in the winding direction. Preferably, the comfort spring 104 has a length sufficient to permit the comfort spring 104 to be expanded and stressed beyond the position it would take if permitted to oppose winding of the spool 14 throughout movement of the webbing 16 into th fully wound up, parked position. In practice of the invention, the preferred comfort spring 104 is capable of about ten expanding revolutions when in an unstressed condition. The preferred comfort spring 104 is also capable of about two additional expanding revolutions when the spool 14 reaches the position in which the webbing 16 is parked. The same characteristics would apply to an alternate comfort spring which contracts when stressed and expands when unstressed.

From the above description of a preferred embodiment of the present invention, those skilled in the art will perceive improvements, changes and modifications. Such improvements, changes and modifications are intended to be covered by the appended claims.

Having described a preferred embodiment of the invention, the following is claimed:

1. A seat belt retractor comprising:
   a spool for holding seat belt webbing to be buckled around a vehicle occupant, said spool being supported for rotation in winding and unwinding directions;
   a rewind spring for biasing said spool in said winding direction;
   comfort means for applying a force to counteract at least some of the winding force of said rewind spring, said comfort means applying said counteracting force in response to rewinding of webbing onto said spool by said rewind spring after the webbing has been unwound and buckled around a vehicle occupant; and
   said comfort means applying said counteracting force throughout unwinding and rewinding of webbing which is wound onto said spool while the webbing is buckled around a vehicle occupant, said counteracting force applied by said comfort means increasing throughout rewinding of webbing which is wound onto said spool while the webbing is buckled around the vehicle occupant.

2. A seat belt retractor as defined in claim 1, wherein said counteracting force applied by said comfort means decreases throughout unwinding a webbing which is wound onto said spool while the webbing is buckled around a vehicle occupant.

3. A seat belt retractor as defined in claim 2 wherein said spool is rotatable in said unwinding direction into an initial position for webbing unwound from said spool to be buckled around a vehicle occupant, said spool is further rotatable in said unwinding direction to a final position in which a maximum length of webbing is unwound from said spool, and said spool is rotatable in said winding direction back from said final position to said initial position, said comfort means applying said counteracting force throughout rotation of said spool between said final position and said initial position.

4. A seat belt retractor as defined in claim 3 wherein said comfort means comprises a comfort spring for opposing the force of said rewind spring, and said comfort spring being stressed from an unstressed condition to a stressed condition by said rewind spring when opposing the force of said rewind spring, the stress in said comfort spring when in said stressed condition being proportional to the amount of rotation of said spool in said winding direction between said final position and said initial position.

5. A seat belt retractor comprising:
   a spool for holding seat belt webbing to be buckled around a vehicle occupant, said spool being supported for rotation in winding and unwinding directions;
   a rewind spring for biasing said spool to rotate in said winding direction;
   comfort means for applying a force to counteract at least some of the winding force of said rewind spring, said comfort means being actuated by rewinding of webbing onto said spool after the webbing has been unwound and buckled around a vehicle occupant; and
   said counteracting force of said comfort means being proportional to the length of webbing which is wound onto said spool while the webbing is buckled around a vehicle occupant.

6. A seat belt retractor as defined in claim 5 wherein said comfort means comprises a comfort spring for opposing the force of said rewind spring, said comfort spring being stressed from an unstressed condition by said rewind spring when opposing the force of said rewind spring, said comfort spring being increasingly stressed by said rewind spring throughout winding of the webbing while the webbing is buckled around a vehicle occupant.

7. A seat belt retractor as defined in claim 6 wherein said spool is rotatable in said unwinding direction into an initial position for webbing unwound from said spool to be buckled around a vehicle occupant, said spool is further rotatable in said unwinding direction to a final position in which a maximum length of webbing is unwound from said spool, and said spool is rotatable in said winding direction back from said final position to said initial position, said comfort spring opposing said rewind spring throughout rotation of said spool between said final position and said initial position.

8. A seat belt retractor comprising:
   a spool for holding seat belt webbing, said spool being supported for rotation in winding and unwinding directions, said spool having a rest position in which a maximum length of webbing is wound onto said spool, and a final position in which a maximum length of webbing is unwound from said spool;
   a rewind spring for biasing said spool to rotate in said winding direction from said final position to said rest position;

a comfort spring for biasing said spool in said unwinding direction in opposition to said rewind spring; and means for selectively engaging said comfort spring to oppose said rewind spring, said comfort spring being stressed by said rewind spring when engaged to oppose said rewind spring, said comfort spring having a capacity to be increasingly stressed by said rewind spring throughout rotation of said spool in said winding direction from said final position to said rest position;

said comfort spring being stressed from an unstressed state to a stressed state by said rewind spring when engaged to oppose said rewind spring;

said comfort spring having an axis, a first end portion, and a second end portion, said first and second end portions being rotated relative to one another about said axis when said comfort spring is being stressed by said rewind spring, said comfort spring having a length between said first and second end portions permitting said end portions to rotate relative to one another to oppose said rewind spring throughout rotation of said spool in said winding direction form said final position to said rest position.

9. A seat belt retractor as defined in claim 8 further comprising a ratchet wheel rotatable about said comfort spring axis in said winding and unwinding directions, said first end portion of said comfort spring being connected to said spool and said second end portion of said comfort spring being connected to said ratchet wheel, said comfort spring opposing rotation of said spool relative to said ratchet wheel in said winding direction, and said engaging means releasably blocking rotation of said ratchet wheel in said winding direction to enable said comfort spring to oppose rotation of said spool relative to said ratchet wheel in said winding direction.

10. A seat belt retractor as defined in claim 9 further comprising means for disengaging said comfort spring from engagement with said rewind spring.

11. A seat belt retractor comprising:
a spool for holding seat belt webbing to be buckled around a vehicle occupant, said spool being supported for rotation in winding and unwinding directions;

a rewind spring for biasing said spool in said winding direction;

comfort means for applying a force to counteract at least some of the winding force of said rewind spring, said comfort means applying said counteracting force in response to rewinding of webbing onto said spool after by said rewind spring after the webbing has been unwound and buckled around a vehicle occupant; and said comfort means applying said counteracting force throughout unwinding and rewinding of any length of webbing which is wound onto said spool while the webbing is buckled around a vehicle occupant, said counteracting force applied by said comfort means increasing throughout rewinding of any length of webbing which is wound onto said spool while the webbing is buckled around the vehicle occupant.

12. A seat belt retractor as defined in claim 11 wherein said counteracting force applied by said comfort means decreases throughout unwinding of any length of webbing which is wound onto said spool while the webbing is buckled around a vehicle occupant.

13. A seat belt retractor as defined in claim 12 wherein said spool is rotatable in said unwinding direction into an initial position for webbing unwound from said spool to be buckled around a vehicle occupant, said spool is further rotatable in said unwinding direction to a final position in which a maximum length of webbing is unwound from said spool, and said spool is rotatable in said winding direction back from said final position to said initial position, said comfort means applying said counteracting force throughout any amount of rotation of said spool between said final position and said initial position.

14. A seat belt retractor as defined in claim 13 wherein said comfort means comprises a comfort spring for opposing the force of said rewind spring, and said comfort spring being stressed from an unstressed condition to a stressed condition by said rewind spring when opposing the force of said rewind spring, the stress in said comfort spring when in said stressed condition being proportional to the amount of rotation of said spool in said winding direction between said final position and said initial position.

15. A seat belt retractor comprising:
a spool for holding seat belt webbing to be buckled around a vehicle occupant, said spool being supported for rotation in winding and unwinding directions;

a rewind spring for biasing said spool to rotate in said winding direction;

comfort means for applying a force to counteract at least some of the winding force of said rewind spring, said comfort means being actuated by rewinding of webbing onto said spool only after the webbing has been unwound and buckled around a vehicle occupant; and said counteracting force of said comfort means being proportional to any length of webbing which is wound onto said spool while the webbing is buckled around a vehicle occupant.

16. A seat belt retractor as defined in claim 15 wherein said comfort means comprises a comfort spring for opposing the force of said rewind spring, said comfort spring being stressed from an unstressed condition by said rewind spring when opposing the force of said rewind spring, said comfort spring being increasingly stressed by said rewind spring throughout any amount of winding of the webbing while the webbing is buckled around a vehicle occupant.

17. A seat belt retractor as defined in claim 16 wherein said spool is rotatable in said unwinding direction into an initial position for webbing unwound from said spool to be buckled around a vehicle occupant, said spool is further rotatable in said unwinding direction to a final position in which a maximum length of webbing is unwound from said spool, and said spool is rotatable in said winding direction back from said final position to said initial position, said comfort spring opposing said rewind spring throughout any amount of rotation of said spool between said final position and said initial position.

18. A seat belt retractor comprising:
a spool for holding seat belt webbing, said spool being supported for rotation in belt winding and unwinding directions;

a first spring for biasing said spool to rotate in said winding direction to wind up webbing unwound from said spool;

a second spring for biasing said spool in said unwinding direction in opposition to said first spring, said second spring having an unstressed state; and means for engaging said second spring to oppose said first spring, said second spring when engaged to oppose said first spring being stressed from said unstressed state by said first spring in an amount proportional to the length of webbing wound onto said spool while said second spring is engaged to oppose said first spring, said second spring being unstressed while said second spring is not engaged to oppose said first spring.

19. A seat belt retractor as defined in claim 18 wherein said spool is rotatable in said unwinding direction into an initial position for webbing unwound from said spool to be buckled around a vehicle occupant, said spool is further rotatable in said unwinding direction to a final position in which a maximum length of webbing is unwound from said spool, and said spool is rotatable in said winding direction back form said final position to said initial position, and said second spring opposing said first spring throughout any amount of rotation of said spool between said final position and said initial position.

20. A seat belt retractor comprising:

a spool for holding seat belt webbing, said spool being supported for rotation in winding and unwinding directions, said spool having a rest position in which a maximum length of webbing is wound onto said spool, and a final position in which a maximum length of webbing is unwound from said spool;

a rewind spring for biasing said spool to rotate in said winding direction from said final position to said rest position;

a comfort spring for biasing said spool in said unwinding direction in opposition to said rewind spring; and means for selectively actuating engagement of said comfort spring upon rotation of said spool in the winding direction to oppose said rewind spring, said comfort spring being stressed by said rewind spring when engaged to oppose said rewind spring, said comfort spring having a capacity to be increasingly stressed by said rewind spring throughout rotation of said spool in said winding direction from said final position to said rest position.

21. A seat belt retractor as defined in claim 20 wherein said comfort spring is stressed from an unstressed state to a stressed state by said rewind spring when engaged to oppose said rewind spring.

22. A seat belt retractor comprising:

a spool supported for rotation about an axis in winding and unwinding directions;

a first spring biasing said spool to rotate in said winding direction;

a second spring having a first end portion and a second end portion, said first end portions being connected to said spool for rotation with said spool in said winding and unwinding direction, said second end portion being rotatable with said spool in said unwinding direction; and means for selectively preventing said second end portion of said second spring from rotating with said spool in said winding direction to enable said second spring to oppose rotation of said spool in said winding direction under the influence of said first spring.

23. A seat belt retractor as defined in claim 22 further comprising a frame, said spool being rotatable relative to said frame, said preventing means comprising means for releasably connecting said second end portion of said second spring to said frame.

24. A seat belt retractor as defined in claim 23 wherein said preventing means comprises a ratchet wheel rotatable about said axis in said winding and unwinding directions, and pawl means for releasably engaging said ratchet wheel with said frame to block rotation of said ratchet wheel in said winding direction, said second end portion of said second spring being connected to said ratchet wheel.

25. A seat belt retractor comprising:

a spool supported for rotation about an axis in winding and unwinding directions;

a rewind spring biasing said spool to rotate in said winding direction;

a ratchet wheel rotatable about said axis in said winding and unwinding directions;

a comfort spring having a first end portion connected to said spool and a second end portion connected to said ratchet wheel, said comfort spring opposing rotation of said spool relative to said ratchet wheel in said winding direction; and means for releasably blocking rotation of said ratchet wheel in said winding direction to enable said comfort spring to oppose rotation of said spool relative to said ratchet wheel in said winding direction.

26. A seat belt retractor as defined in claim 25 wherein said comfort spring is stressed from an unstressed condition to a stressed condition by said rewind spring when said spool rotates relative to said ratchet wheel in said winding direction.

* * * * *

UNITED STATES PATENT AND TRADEMARK OFFICE
CERTIFICATE OF CORRECTION

PATENT NO.   :   5,131,594
DATED        :   July 21, 1992
INVENTOR(S)  :   Lawrence M. Refior, Glyn O. Dykins It is certified that error appears in the above-identified patent and that said Letters Patent is hereby corrected as shown below:

Column 7, Line 64, Claim 2, change "a" to --of--.

Column 9, Line 24, Claim 8, change "form" to --from--.

Column 12, Line 9, Claim 22, change "portions" to --portion--.

Column 12, Line 11, Claim 22, change "direction" to --directions--.

Signed and Sealed this

Twenty-fourth Day of August, 1993

Attest:

BRUCE LEHMAN

Attesting Officer

Commissioner of Patents and Trademarks